United States Patent [19]

Brazelton

[11] 4,197,815
[45] Apr. 15, 1980

[54] AQUATIC EXERCISE FACILITY FOR ANIMALS

[75] Inventor: Carl L. Brazelton, Bonfield, Ill.

[73] Assignee: Stran Corporation, Bradley, Ill.

[21] Appl. No.: 910,668

[22] Filed: May 30, 1978

[51] Int. Cl.$^2$ ...................... A01K 15/02; A61D 11/00
[52] U.S. Cl. ..................................... 119/29; 119/158; 4/172.16; 272/26
[58] Field of Search .................... 119/29, 158; 272/26; 4/172.16, 172.17

[56] References Cited

U.S. PATENT DOCUMENTS

| | | | |
|---|---|---|---|
| 1,630,797 | 5/1927 | Marwick | 4/172.16 |
| 1,637,423 | 8/1927 | Miller | 4/172.16 |
| 1,731,554 | 10/1929 | Wheeler | 272/26 |
| 2,611,341 | 9/1952 | Paris | 119/158 |
| 3,605,131 | 9/1971 | Brazel et al. | 4/172.16 |
| 3,691,995 | 9/1972 | Little | 119/29 |
| 3,916,839 | 11/1975 | Hewes, Jr. | 119/158 |
| 4,052,757 | 10/1977 | Dotson | 4/172.16 |

*Primary Examiner*—Hugh R. Chamblee
*Attorney, Agent, or Firm*—Vogel, Dithmar, Stotland, Stratman & Levy

[57] ABSTRACT

An aquatic exercise facility for animals including a pool of water having an animal entry area and an animal exit area in alignment with a portion of the pool therebetween of a depth sufficient to require the animal to swim thereacross, mechanism for pumping water to establish a current from the animal exit area toward the animal entry area, the pumping mechanism having an inlet and an outlet for water thereto and a control for controlling the amount of water pumped thereby, a return channel for water disposed on either side of the pool for returning water from the animal entry area to the inlet to the pumping mechanism, and adjustable flow control structure disposed between the deep portion of the pool and the return channels for adjusting the rate of flow of water therebetween; also disclosed are directing vanes at the outlets from the pumping mechanism to direct the current to provide a higher velocity along the sides of the pool than in the middle thereof; there further is disclosed an improved water filtration and treatment system for use with such facilities as well as an improved channel structure.

50 Claims, 12 Drawing Figures

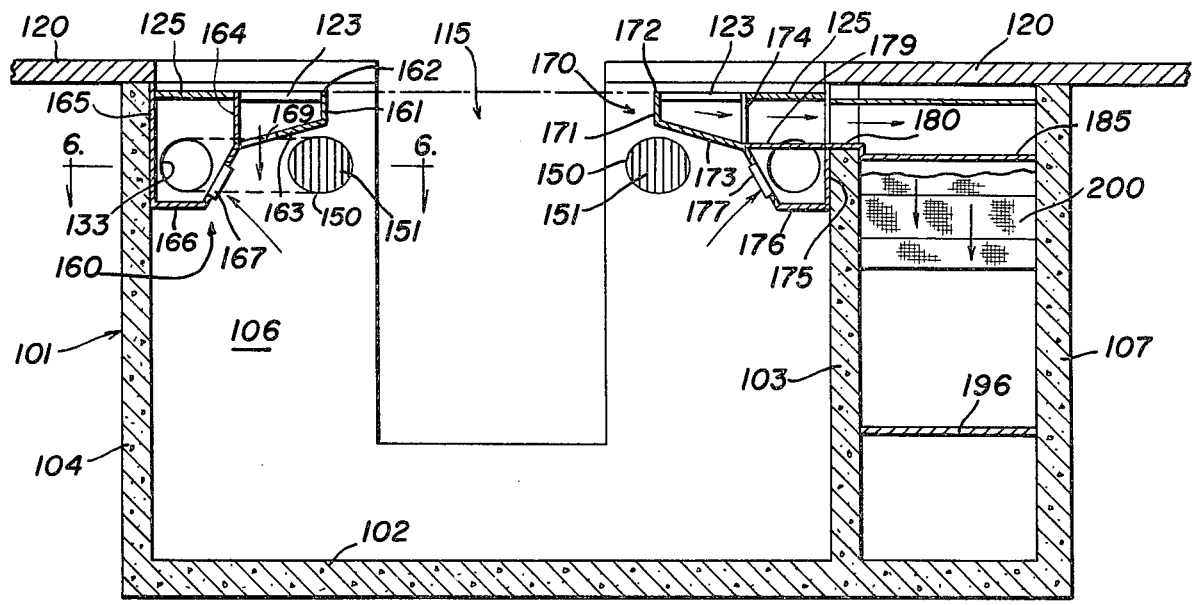
FIG. 5
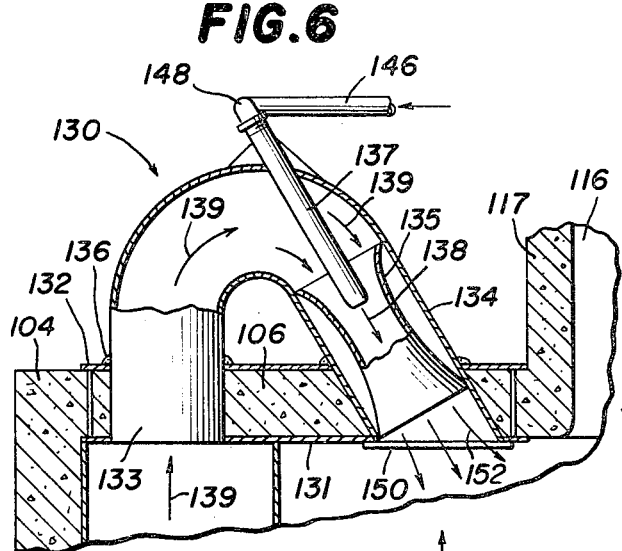
FIG. 6
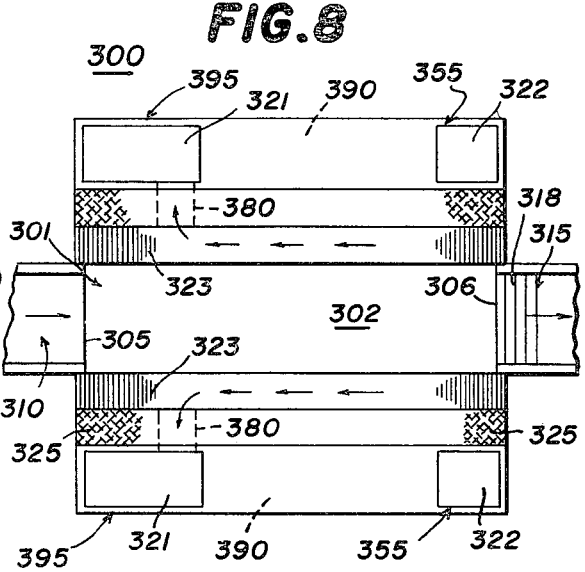
FIG. 8
FIG. 7

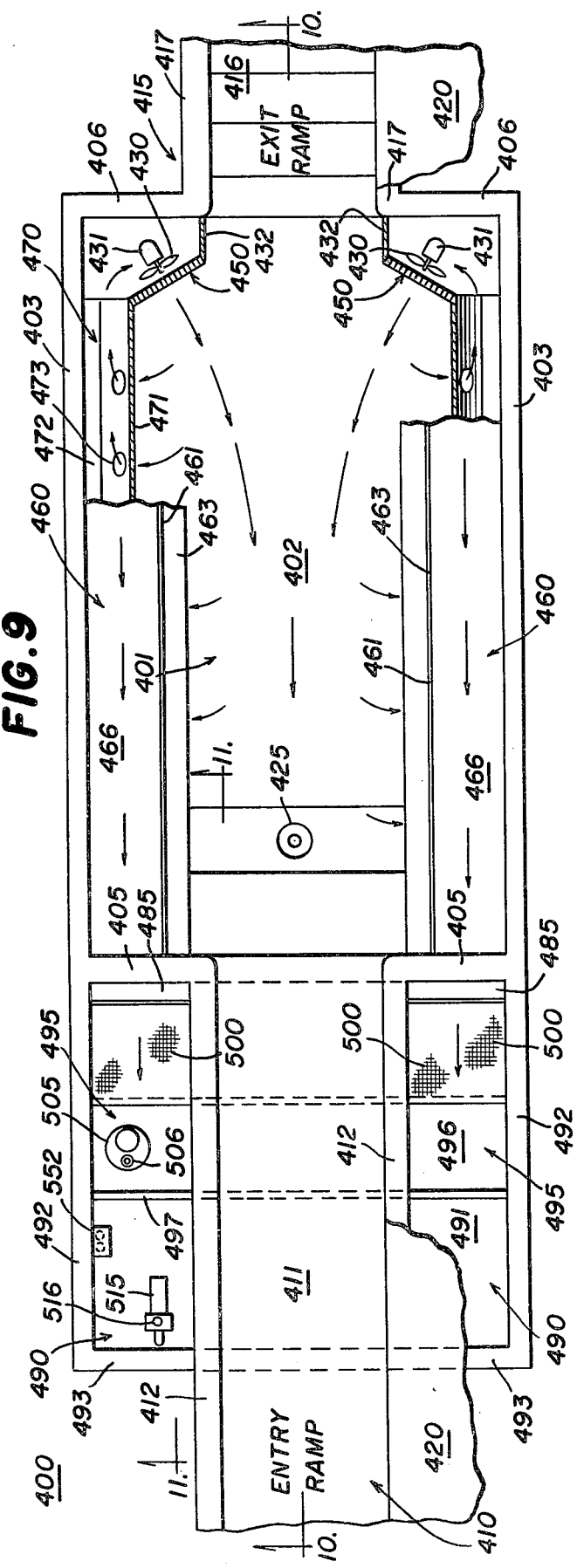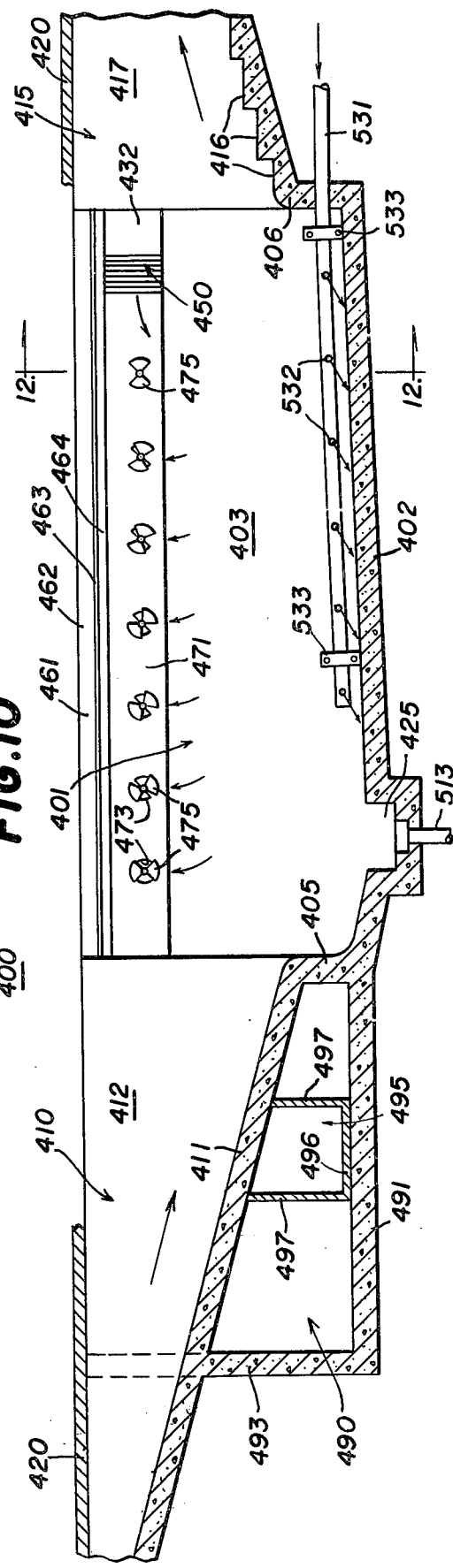

AQUATIC EXERCISE FACILITY FOR ANIMALS

PRIOR ART STATEMENT AND BACKGROUND OF THE INVENTION

The present invention relates generally to exercise devices for animals, and especially to exercise devices that serve as a hydraulic treadmill for animals.

One form of exercise facility utilized heretofore is illustrated in U.S. Pat. No. 3,691,995 granted Sept. 19, 1972 to G. M. Little. This patent shows a large swimming pool with no facility for resisting the movement of the horse or other animal using the pool and there are no facilities for cleaning the pool or the water contained therein.

In another form of prior art device, a treadmill was provided in a body of water, see U.S. Pat. No. 3,485,213 granted Dec. 23, 1969 to E. J. Scanlon. In general, the animal, and specifically a horse, had essentially his entire weight rested upon his legs while running on a treadmill 36, the animal's legs being submerged in water, but supporting essentially the entire weight of the animal. Such devices are expensive, difficult to maintain and operate, and present a hazard to the lower legs and hoofs of animals using the apparatus.

There is illustrated in U.S. Pat. Nos. 3,543,724 and 3,543,725 granted Dec. 1, 1970 to M. B. Kirkpatrick et al. an exercise system wherein the animal is permitted to swim while being held in place. The restraint on the animal restricts the full use of its muscles and requires very close supervision and control to be sure that the animal does not drown and is not injured.

Finally, there is shown in U.S. Pat. No. 3,835,815 granted Sept. 17, 1974 to R. Matthews an animal conditioner wherein the animal is maintained in a sling in a body of water for swimming action. The presence of the sling makes it unnecessary for the animal to swim if it does not desire to do so, and again careful continual supervision must be maintained at all times to be sure that the horse does not drown and is not injured.

SUMMARY OF THE INVENTION

The present invention provides an aquatic exercise facility for animals which is small in size, yet permits the animal to swim freely essentially in place, thereby providing in essence a swimming treadmill.

This is accomplished in the present invention, and it is an important object of the present invention to accomplish these desired results, by providing an aquatic exercise facility for animals including a container for a pool of water having an animal entry area and an animal exit area, a portion of the pool between the animal entry area and the animal exit area having a depth sufficient to require an animal to swim thereacross, and means for establishing a current of water flowing from adjacent to the animal exit area toward the animal entry area through the deep portion, whereby an animal entering the pool at the animal entry area must swim across the deep portion and against the current to reach the animal exit area, thereby to exercise the animal by causing it to swim against the current flowing through the deep portion.

Another object of the invention is to provide in an aquatic exercise facility of the type set forth, flow control structure controlling the lateral flow of the current of water and flow back towards the animal exit area so as to provide a minimum lateral flow adjacent to the animal exit area and a maximum lateral flow adjacent to the animal entry area, the flow control structure providing a minimum current adjacent to the animal entry area with the current increasing in strength toward the animal exit area.

Yet another object of the invention is to provide an aquatic exercise facility of the type set forth that includes a return channel for water disposed on at least one side of the deep portion for returning water from adjacent to the animal entry area to adjacent to the animal exit area, and adjustable flow control structure disposed between the deep portion and the return channel for adjusting the rate of flow of water through the deep portion.

Still another object of the invention is to provide an aquatic exercise facility of the type set forth wherein the water pumping mechanism is provided with a control for controlling the amount of water pumped by the mechanism and for thus controlling the velocity of the current through the deep portion, thereby to adjust the current to provide the optimum for each animal and each size of animal using the facility.

Yet another object of the invention is to provide in an aquatic exercise facility of the type set forth both lateral flow control and main current flow control so as to provide not only the optimum total current flow but the optimum distribution thereof through the swimming course for the animal.

Still another object of the invention is to provide an aquatic exercise facility of the type set forth wherein the outlet from the pumping mechanism is provided with flow directing mechanism so as to direct the current of water along the sides of the pool to provide a higher velocity of current along the sides than in the middle thereof, thus tending to maintain the animal in the middle of the pool during the swimming exercise.

Yet another object of the invention is to provide in an aquatic exercise facility of the type set forth a water filtration treatment system associated therewith for receiving a portion of the flow of water through the pool for filtering and treatment thereof so as to maintain the water in a clean and hygienic condition.

Still another object of the invention is to provide in an aquatic exercise facility of the type set forth an improved channel structure including a return channel for returning water from the pool to the inlet to the water pumping mechanism and a treatment channel for conveying a portion of the water from the pool to the water filtration and treatment system.

A further object of the invention is to provide an aquatic exercise facility of the type set forth wherein the pool is provided with a sump in the bottom thereof, the water returned to the pool from the treatment system being directed along the bottom of the pool and towards the sump so as to provide automatic cleaning of the floor of the pool.

A still further object of the invention is to provide an improved filtering system for use with the aquatic exercise system of the type set forth, the filtering system using a bed of particulate matter through which the water is filtered to remove solids therefrom, and air blowing mechanism and oxidizing chemical treatment mechanism for back flushing the bed quickly and with a minimum use of water.

Further features of the invention pertain to the particular arrangement of the parts of the aquatic exercise facility, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 5 is an enlarged view in transverse section along the line 5—5 of FIG. 2;

FIG. 6 is a further enlarged view in horizontal section with certain portions broken away along the line 6—6 of FIG. 5;

FIG. 7 is a schematic and diagrammatic view of the water filtration and treatment system forming a part of the facility of FIG. 1;

FIG. 8 is a plan view on a reduced scale of a second preferred embodiment of an aquatic exercise facility made in accordance with and embodying the principles of the present invention, the facility of FIG. 8 having water filtration and treatment systems on both sides thereof;

FIG. 9 is a plan view with certain portions broken away of a third preferred embodiment of an aquatic exercise facility made in accordance with and embodying the principles of the present invention;

FIG. 10 is a view in longitudinal vertical section along the line 10—10 of FIG. 9;

DESCRIPTION OF THE PREFERRED EMBODIMENTS

Figure 1:
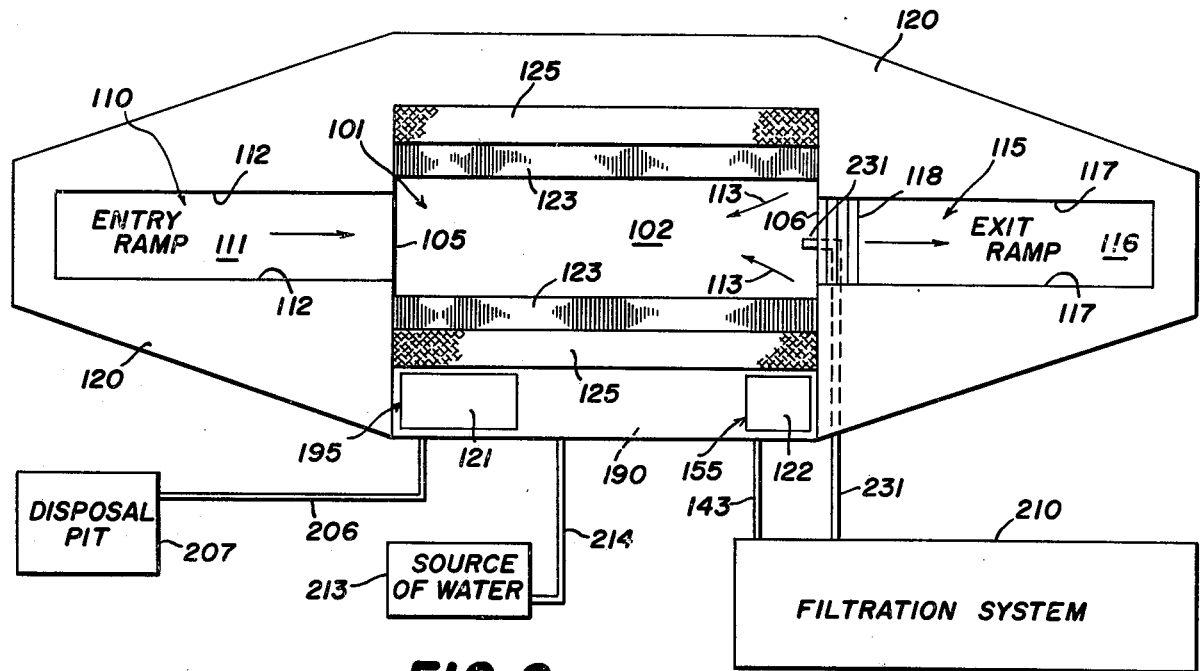
FIG. 1 is a plan view of a first preferred embodiment of an aquatic exercise facility made in accordance with and embodying the principles of the present invention.

Referring to FIGS. 1 to 7 of the drawings, there is illustrated a first preferred embodiment of an aquatic exercise facility 100 made in accordance with and embodying the principles of the present invention. As illustrated, the facility 100 includes a container 101 for a pool of water, the container 101 having a bottom wall 102 (see FIGS. 3 and 4 particularly), two opposed generally parallel side walls 103 and 104 extending upwardly from opposed sides of the bottom wall 102 and extending longitudinally of the facility 100, an entry end wall 105 and an exit end wall 106. Spaced outwardly from the side wall 103 is an outer wall 107 and in the space therebetween is a transverse partition 108 extending therethrough (see FIGS. 2 and 4). Disposed to the left in FIGS. 1 to 4 is an entry area generally designated by the numeral 110 and including an entry ramp 111 that inclines downwardly from a deck 120 to the left in FIG. 1 to the entry end wall 105. An exit area 115 is disposed to the right in FIG. 1 and includes an exit ramp 116 that extends upwardly from the exit end wall 106 to the level of the deck 120 disposed to the right in FIG. 1.

The entry ramp 111 has vertical spaced-apart side walls 112 to direct the animal therealong, while the exit ramp 116 has spaced-apart side walls 117 that direct the animal out of the pool 101.

As illustrated, there is disposed between the walls 103 and 107 (see FIGS. 2 and 4 particularly) a pump chamber 155, a surge tank 190 and a solids pit 195. Access to the solids pit 195 is through a cover 121, while access to the pump chamber 155 is provided by a cover 122. Disposed along one side of the pool 101 is a first gutter and flume 160 and along the other side of the pool 101 is a second gutter and flume 170. Each of the gutters is covered by a grating 123, while each of the flumes is covered by a footwalk 125 upon which the handler of the animal can stand to observe and assist the animal during the use of the facility 100.

Figure 2:
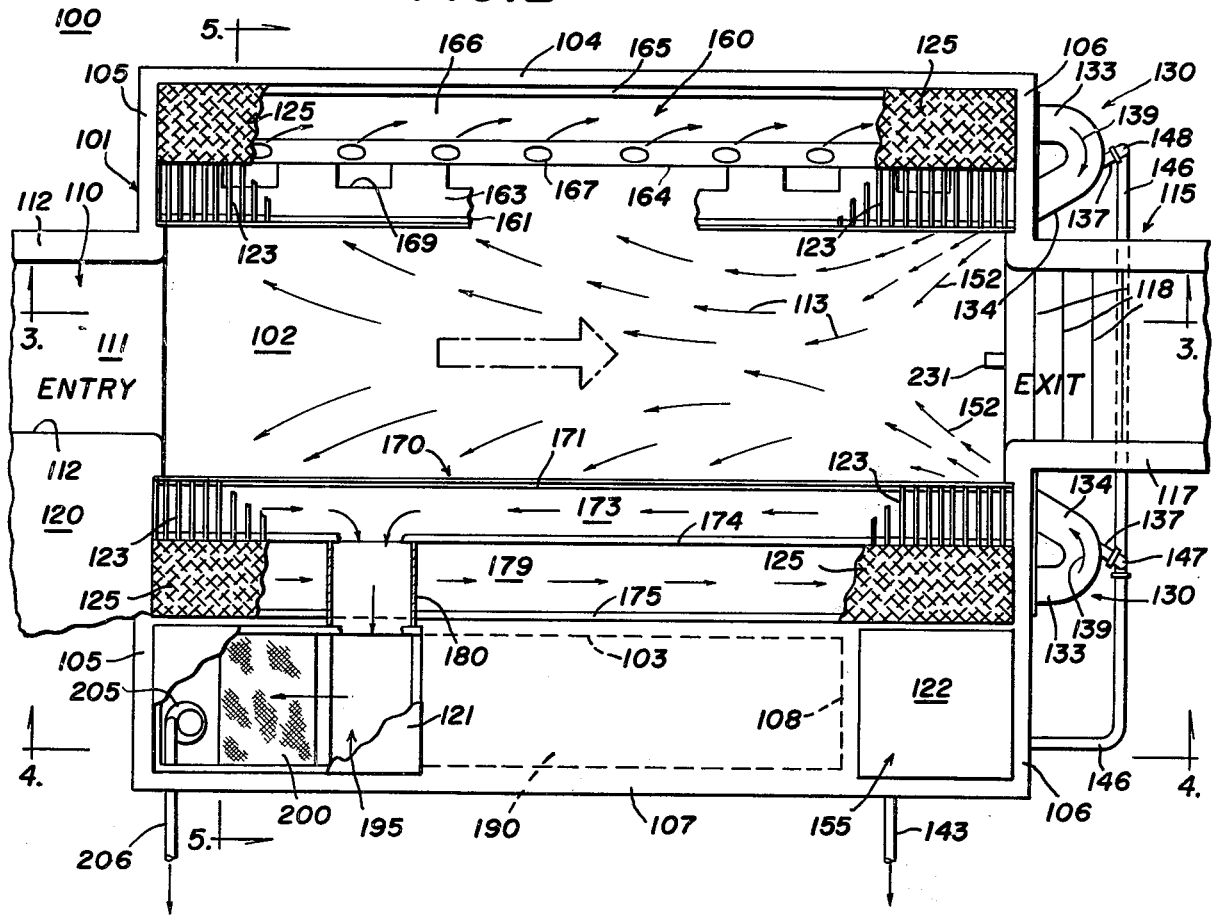
FIG. 2 is an enlarged plan view with certain portions broken away of the pool area of the facility of FIG. 1.
Figure 3:
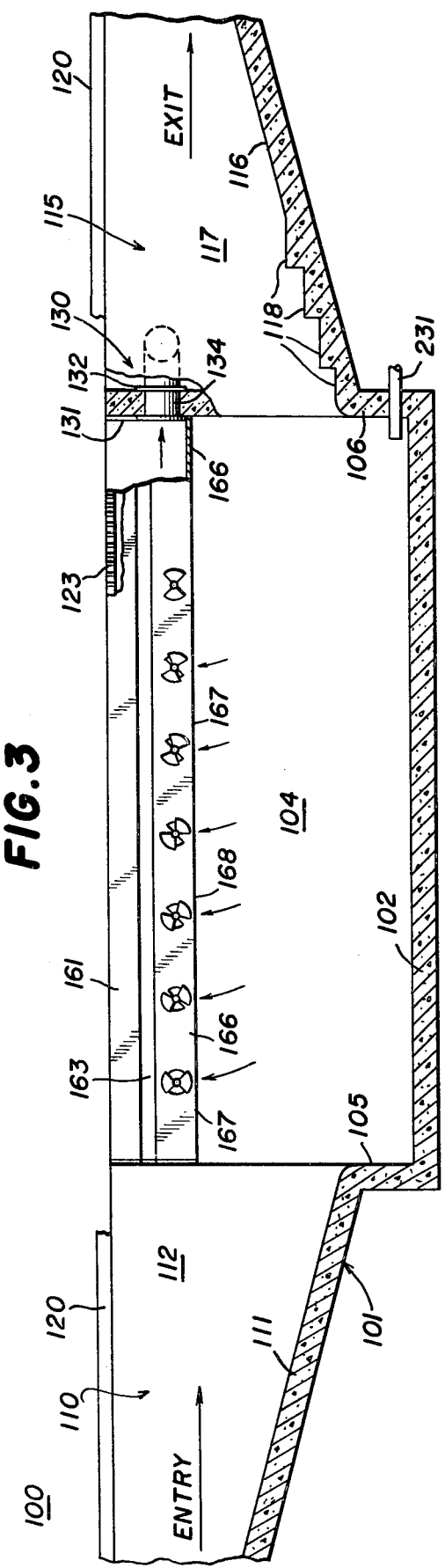
FIG. 3 is a view in longitudinal vertical section along the line 3—3 of FIG. 2.

It is an important feature of the present invention that a current be established in the pool 101 flowing from the exit ramp area 115 toward the entry ramp area 110, or from right to left as viewed in FIGS. 1 and 2, and specifically in the direction of the arrows 113 therein. To this end, there has been provided a current generating device in the form of two venturi jet pumps 130, the details of construction of which are best seen in FIG. 6 of the drawings. Each of the jet pumps 130 has an inner wall 131 and an outer wall 132 adapted to be disposed on opposite sides of a portion of the exit end wall 106. A generally circular inlet tube 133 is supported by the walls 131 and 132 and is secured thereto as by welds 136. The inlet tube 133 is bent through an acute angle and there is provided an outlet tube 134, also essentially circular in cross section. The longitudinal axes of the inlet tube 133 and the outlet tube 134 are disposed at an acute angle of approximately 30°, the longitudinal axis of the inlet tube 133 being generally parallel to the longitudinal axis of the pool 101, and the longitudinal axis of the outlet pipe 134 being disposed at an acute angle of about 30° with respect to the longitudinal axis of the pool 101 and disposed to the side thereof. Disposed within the outlet tube 134 is a venturi section 135 that is fixedly secured to the inner walls of the outlet tube 134. Extending through the wall of the outlet tube 134 is a high pressure pipe 137 that has the longitudinal axis thereof in alignment with the longitudinal axis of the outlet tube 134 and the venturi section 135. The outlet end of the pipe 137 is disposed at the entry to the throat of the venturi section 135. When the pipe 137 is delivering a high velocity, low volume stream of water in the direction of the arrow 138, it pulls water from the inlet tube 133 in the direction of the arrows 139 and delivers a high volume medium velocity stream from the outlet tube 135 in the direction of the arrows 152. The stream in the direction of the arrows 152 passes through a grille 150 covering the outlet of the tube 134, the grille 150 having a plurality of vanes 151 mounted therein and laterally spaced apart and adjustable about the longitudinal axes thereof so as to direct the stream represented by the arrows 152.

Figure 4:
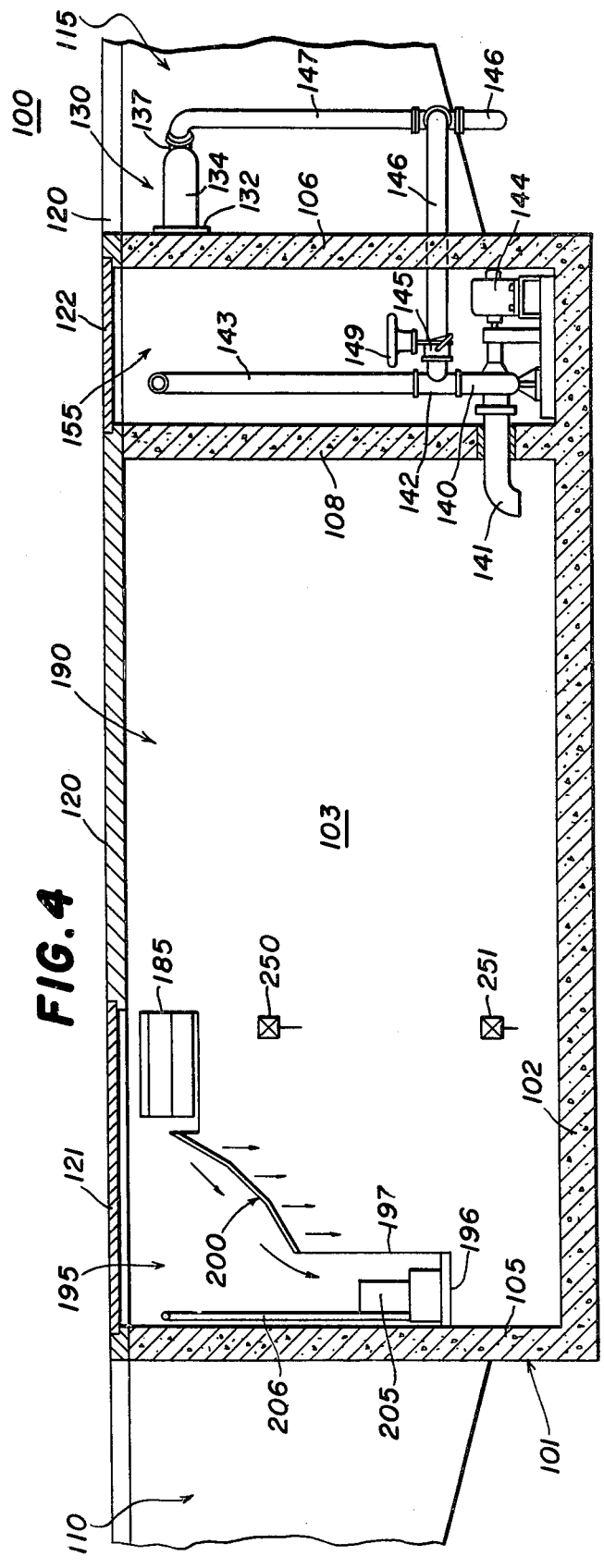
FIG. 4 is a further enlarged view in longitudinal vertical section along the line 4—4 of FIG. 2.

The low volume high velocity water stream in the pipe 137 is generated by a pump 140 disposed in the pump chamber 155 (see FIG. 4 particularly). The inlet to the pump 140 is connected to a pipe 141 that passes through the wall 108 and is in communication with the surge tank 190. The outlet of the pump 142 is to a T-section 142, one of the outlets from the T-section 142 being to a supply pipe 140 and the other one being to a flow control valve 145. The pump 140 is driven by a motor 144 coupled thereto and disposed in the pump chamber 155. The flow control valve 145 is manually operable by means of a hand wheel 149, and when the valve 145 is opened, water flows from the pump 140 through a flow pipe 146 to supply pipes 147 and 148 that supply the water to the high pressure pipes 137 in the venturi jet pumps 130.

In order to complete the circuit for the current of water generated by the jet pumps 130, the first gutter and flume 160 is provided along the wall 104 of the pool 101, and the second gutter and flume 170 is provided along the wall 103 of the pool 101. The first gutter and flume 160 includes an inner wall 161 spaced inwardly from the pool side wall 104, the inner wall 161 being disposed essentially vertically and having an upper edge 162 at the water level within the pool 101 so as to receive any overflow therefrom. A first bottom wall 163 extends from the lower edge of the inner wall 161 downwardly and to the right as viewed in FIG. 5 and has therein a plurality of rectangular openings 169 spaced longitudinally therealong. The bottom wall 163 terminates at an internal vertical wall 164 that is spaced inwardly from an outer vertical wall 165 that is supported by the pool side wall 104. Interconnecting the lower edges of the walls 164 and 165 is a second bottom wall 166, a portion of the bottom wall 166 being inclined and containing inlets 167 spaced longitudinally therealong, see FIGS. 2 and 3 also. Disposed in each of the inlets 160 is a flow control vane 168 which can be adjusted between a fully closed position with respect to the associated inlet 167 and a fully open position with respect to the associated inlet 167. The vertical walls 161 and 164 together with the first bottom wall 163 form a dummy gutter, the water flowing over the upper edge 162 into the gutter flowing downwardly through the rectangular outlets 169 in the bottom wall 163. The vertical wall 164 and 165 together with the second bottom wall 166 form a flume that is useful to receive water through the inlets 167 past the vanes 168, which water is then returned to the inlet tube 133 for the associated jet pump 130.

The combination gutter and flume 170 is functional and also includes a vertical inner wall 171 spaced inwardly with respect to the associated pool side wall 103 and having an upper edge 172 at the water level in the pool 101. Sloping downwardly and outwardly from the inner wall 171 is a first bottom wall 173 that terminates at an internal vertical side wall 174 that is inwardly spaced with respect to a vertical side wall 175 mounted on the pool side wall 103. A second bottom wall 176 joins the bottoms of the side walls 174 and 175 and includes an upwardly inclined portion having flume inlets 177 spaced at intervals therealong, each flume inlet 177 having an associated flow control vane 178 that can be adjusted from a position fully to close the associated inlet 177 to a position wherein the maximum opening is provided in the inlet 177. An intermediate horizontal wall 179 is provided between the bottom of the vertical wall 174 and an intermediate point on the side wall 175 to provide a passage for water from the gutter to the surge tank 190 (see FIG. 2 also), there being provided thereby an outlet conduit 180 that directs water to a headbox 185 disposed in the surge tank 190 (see FIG. 4 also). By this construction, water is fed along the gutter 170 by gravity to the outlet conduit 180 and thus into the headbox 185 within the surge tank 190.

Referring particularly to FIG. 4 of the drawings, it will be seen that the headbox 185 has associated therewith a sieve 200 which slopes downwardly and to the left in FIG. 4 so that any solid particles falling about the sieve 200 slide therealong and into the solids pit 195. The solids pit 195 is provided by a bottom wall 196 and a side wall 197 extending vertically between the bottom wall 196 and the adjacent edge of the sieve 200. Disposed within the solids pit 195 is an ejector pump 205 having an outlet pipe 206 that connects to a disposal pit 207 (see FIG. 1 also). The sieve 200 serves to separate all solids larger than approximately twenty thousandths of an inch from the flowing water that cascades down the sieve 200. The water containing the solids less than twenty thousandths inch falls into the surge tank 190. Water is withdrawn from the surge tank 190 by means of the pump 140 via the pipe 141. A portion of the water thus withdrawn by the pump 140 from the surge tank 190 is conveyed by the pipe 143 to a filtration system 210 (see FIG. 1 also).

The details of the construction and arrangement of the filtration system 210 are best seen in FIG. 7 of the drawings. The pipe 143 connects to the inlet of a valve 212 which has the outlet connected to a pipe 216. When the filtration system 210 is performing the filtering function, the pipe 216 is connected by an open valve 224 to a pipe 222 connecting to the upper inlet to a high capacity sand filter 220. The filter 220 may utilize any small particulate matter in the filter bed therein, but sand is preferred for economy and convenience. The outlet from the filter bed in the filter 220 is through a pipe 223 which connects to the inlet of a valve 226 that is open during the filtering operation which has the outlet thereof connected to a pipe 227. The pipe 227 in turn connects to the inlet to a valve 228 which has its outlet connected to a pipe 229 that connects to the inlet of a valve 230 that has its outlet connected to a pipe 231 which returns the treated water to the pool 101 through the exit end wall 106 (see FIG. 3).

The sand filter 220 serves to remove the small particulate mater from the water stream flowing therethrough. The filtered stream at the valve 228 can be diverted to an automatic chemical controller 236 which measures the residual chlorine content and pH of the filtered stream. If additional chlorine is required, there is provided beyond the valve 230 a chlorinator 240 which through a meter 241 can add chlorine to the stream in the pipe 230 if required as indicated by the controller 236. Similarly, acid can be provided from an acid feeder 245 through a meter 246 if required to adjust the pH of the outlet stream in the pipe 231. Furthermore, the outlet stream can be heated by diverting the stream using the valve 230 through the heater 237, thus to heat the water stream in the pipe 231 if required before returning it to the pool 101.

It will be appreciated that the facility 100 is often located in rural areas which do not have high capacity water sources. A local source of water 213 is diagrammatically illustrated in FIG. 1 and is connected to the surge tank 190 by a pipe 214. Disposed in the surge tank 190 is an upper or high level sensor 250 and a lower or low level sensor 251 for sensing the level of water in the surge tank 190. Whenever the water falls below the level for the high level sensor 250, water is fed from the source 213 by the pipe 214 to the surge tank 190, until the level of water in the surge tank 190 again actuates the high level sensor 250 to shut off the source 213. If the low level sensor 251 is actuated by the level of water in the surge tank 190 falling therebelow, then operation of the facility 100 is shut down until additional water can be pumped into the surge tank 190.

The limited capacity for replacing water in the surge tank 190 also place a limit on the amount of water available for back flushing the sand filter 220 from time to time as required. Accordingly, there has been provided in the present invention a novel method of back flushing the said filter 220. To this end, there has been provided a high capacity air blower 215 which has the output thereof connected through a valve 228 to the outlet pipe 223 for the sand filter 220. With the air blower 215 operating, the valve 228 open, and the valves 225, 226 and 232 closed, a high velocity jet of air is blown upwardly through the sand filter 220 and through a pipe 239 connected at the upper end of the sand filter 220. The pipe 239 connects by means of a valve 252 to the pipe 218 leading to the disposal pit 207. Excess air can be vented through a second valve 253 to the atmosphere from the pipe 239. There also can be introduced into the bed of the sand filter 220 an oxidizing chemical from a container 235 through a meter 234 and a pipe 233 via the valve 232 to the inlet pipe 223 connecting with the lower end of the filter bed in the sand filter 220. In this fashion an oxidizing solution can be introduced into the bottom of the sand filter and put therethrough to break up and oxidize soil trapped therein, this being done either before, during or after operation of the high capacity air blower 215. Finally, a high velocity water stream from the pipe 143 via the open valve 212, the pipe 216, the open valve 225 and the pipe 223 is provided to give the final back flush to the filter bed in the sand filter 220.

The method and operation of use of the aquatic exercise facility 100 will now be given with reference to FIGS. 1 to 7 of the drawings. Although the facility 100 is useful with almost all types of animals, it has particular utility when applied to the exercise of horses, and the following description will be in conjunction with the exercise of horses in the facility 100. When the facility 100 is designed for use in exercising horses, the length of the pool 101, i.e., the distance between the end walls 105 and 106 is approximately 20 feet, the distance between the side walls 103 and 104 is 12 feet and the depth of water in the pool is about 8 feet. The combination gutter and flume 160 extends into the pool at the top about 1 foot as does the combination gutter and flume 170, whereby to give an effective width at the top of the pool of about 6 feet bounded by the edges of the gutters. When the horse is first introduced to the facility 100, the horse is preferably permitted to go down the entry ramp 111 and swim across the quiet pool 101, i.e., the jet pumps 130 are not operating, and then climb out using the exit ramp 116. The exit ramp 116 is preferably provided adjacent to the pool 101 with exit steps 118 which it has been found extremely helpful in assisting the horse in first gaining its foothold upon the exit ramp 116. The trainer stands upon the gratings 123 and the footwalk 125 during the handling of the horse in the pool 101.

After the horse has become accustomed to the pool, the jet pumps 130 are actuated so as to create a current of water flowing from the exit ramp 116 toward the entry ramp 111. The velocity of the current generated by the jet pumps 130 is adjusted in accordance with the size of the horse being exercised and the vigor and condition of the horse and the amount of exercise that it is desired for the horse to undergo during the use of the facility 100. The velocity of the current is adjusted by the valve 145 using the hand wheel 149, and also by the position of the vanes 168 and 178 with respect to the associated openings 167 and 177. Also the distribution of the velocity of the current along the length of the pool 101 can be adjusted by adjusting individually the vanes 168 and 178 so that the distribution of the current velocity can be controlled and adjusted. Furthermore, the pattern of the current across the width of the pool 101 can be adjusted by the vanes 151 at the outlets from the pumps 130. The vanes 151 preferably are adjusted so that the velocity of the current is greater along the sides and less in the center thus tending to center the exercising animal in the center of the pool.

With the current adjusted in the pool 101, the horse is led down the entry ramp 111 and into the pool 101. The current is minimum at the entry end of the pool 101 and increases in strength toward the exit end of the pool 101. The horse will swim toward the exit ramp 116, and in so doing will face an increasingly strong current of water. This will cause the animal to swim harder and thus obtain the desired exercise. The strength of the current can be adjusted so that the animal makes no progress while exercising, thus creating, in effect, an aquatic treadmill so that the horse can be fully exercised even though the pool 101 is only 20 feet long.

Several of the features of the facility 100 serve to insure the safety and well being of the horse during the use thereof. The gently inclined entry ramp 111 insures that the horse is gradually admitted into the pool 101 without panic. The handler can stand on the gratings 123 and the footwalk 125 at all times and is in easy reach of the horse. Should the horse panic or get into trouble, the jet pumps 130 can be quickly turned off and the horse easily lead across the short pool 101 to the exit ramp 116. The cantilever mounting of the gutters and flumes 160 and 170 also is a safety feature. The horse in exercising sees the space between the vertical side walls 161 and 171 and his body tends to contact those walls and keep the animal centered within the pool 101. As a consequence, the lower legs and hoofs of the horse are well away from the pool side walls 103 and 104 (see FIG. 5). The distribution of the current with the greatest intensity towards the outer wall and the lesser intensity in the center also helps in centering the horse in the current during the exercise period. Likewise, the overall strength of the current can be adjusted to that required by the individual animal or size of animal so that the horse maintains maximum exercise for as long as the trainer wishes while remaining essentially in the same position within the pool 101. Finally, when the exercise is completed, the current generated by the pumps 130 is decreased so that the horse can now swim to the exit ramp 116. The steps 118 at the portion of the ramp 116 adjacent to the wall 106 materially assist the horse in gaining a firm foothold upon the exit ramp 116.

One of the important features of the present invention is the provision of the high capacity water filtration and treatment system 210 designed particularly to handle the heavy loads presented by swimming horses. Horse exercise pools and facilities provided heretofore do not take into account the high soil load imposed upon the pools by horses and other exercising animals. In accordance with the present invention, all soils that float will be washed to the side and across the upper edges 162 and 172 of the respective gutters. The dummy gutter associated with the upper edge 162 simply returns any soil so collected through the rectangular openings 169 and back into the pool 101. Any solids passing over the edge 172 are fed by gravity back to an outlet conduit 180 that dumps the soil onto the headbox 185. The headbox 185 in turn causes the soil to fall by gravity across the sieve 200 where the larger particles (greater than twenty thousandths inch) fall into the solids pit 195 which is periodically emptied using the ejector pump 205 to convey the waste to the disposal pit 207 (see FIG. 1). The smaller particulate material falls through the sieve 200 and into the surge tank 190. A portion of the contents of the surge tank 190 is drawn by the pump 140 (see FIG. 4) therefrom by the pipe 141 and is delivered by the pipe 143 to the filtration treatment system 210 (see FIG. 7). During the filtering portion of the operation, the valve 212 is open, the valve 217 is closed, the valve 252 is closed, the valve 224 is open, the valve 225 and 232 are closed, the valve 226 is open, the valve 228 is open, and the valve 230 will be open or closed depending upon whether the treated stream of water needs to be heated by the heater 237. With the parts in this condition, the water to be treated flows from the pipe 143 through the open valve 212 and the pipe 216 through the open valve 224 and the pipe 222 to the upper end of the sand bed within the filter 220. The water flows downwardly through the bed in the filter 220, the filter removing the small particulate matter, and the filtered water flows from the pipe 223 through the open valve 226 to the pipe 227. The filtered stream is monitored by means of the automatic chemical controller 236 so as to inject chlorine from the chlorinator 240 and acid from the supply 245, as required, to treat the stream in the outlet pipe 231. Also the heater 237 may be utilized to heat the stream in the pipe 231 if required. The treated stream is then fed by the pipe 231 through the exit end wall 106 (see FIGS. 1, 2 and 3) and into the main pool 101.

It will be understood that the normal level of water in the surge tank 190 is essentially set by the high level sensor 250 so as to maintain the level in the surge tank well below the top thereof, but yet providing a supply of water therein. As horses enter the pool 101, they will displace water which flows into the gutter 170 and thus into the surge tank 190, the surge tank 190 accepting the overflow of water from the pool 101. The pump 140 continually withdraws water from the surge tank 190 by the pipe 141 for treatment as described above in the filtration system 210. After a number of horses have been exercised, and typically at the end of a day, or more frequently if required, the sand filter 220 is back flushed to clean the sand, and the solids pit 195 is likewise cleaned by operating the pump 205. In order to back flush the sand filter 220, and in order to conserve the water supply, the high velocity air blower 215 is used to carry the first batch of soil out of the sand filter. To this end, the valve 212 is closed, the valve 217 is closed, the valves 226 and 232 are closed, the valve 228 is opened and the valve 252 is opened and the valves 224 and 225 are closed. Operation of the air blower 215 forces a strong blast of air upwardly through the sand bed in a direction opposite to that of flow of water during the filtering operation, the solids being blown along the line 239 through the open valve 252 and the pipe 214 into the waste disposal pit 207. Excess air is vented through the valve 253 to atmosphere. Preferably simultaneously, the valve 232 is opened so as to introduce oxidizing fluid from the container 235 through the meter 234 into the bed in the filter 220. This further serves to break up and destroy the solid organic soil in the bed of the filter 220. As a final back flushing step, the blower 215 is de-energized, and the valves 228 and 232 are closed. The valve 212 is opened as is the valve 225, the valve 226 remains closed, the valves 217 and 224 remain closed while the valve 252 remains open. The pump 140 then pumps water from the surge tank 190 through the pipe 143 and the open valve 212 through the pipe 216 where it is directed through the open valve 225 and the pipe 223 to the lower end of the bed in the sand filter 220. This water then flushes up through the sand bed and through the pipe 239 through the open valve 252 to the pipe 214 and thus to the disposal pit 207.

As soon as the pump 140 starts drawing the back flush water from the surge tank 190, the water level therein will shortly fall below that indicated by the high level sensor 250, this causing water to be drawn from the source 213 by the pipe 214 and into the surge tank 190. This makeup water will continue to flow into the surge tank 190 so long as the level of water is below that of the high level sensor 250. Should the drain of water from the surge tank 190 be sufficient so as to reach the low level sensor 251, then the jet pumps and operation of the facility 100 is interrupted until the water level again reaches at least that indicated by the low level sensor 251. This described back flushing operation of the filter 220 minimizes water use, this being important in many rural areas where high volume sources of makeup water are unavailable.

As a result of the above described filtration and treatment system 210, the water within the pool 101 is maintained in a sanitary and hygienic condition during the exercise of the animals. This is true even though large animals, such as horses, impose a very substantial organic waste load upon the system. It is pointed out that the filtration system 210 and the disposal pit 207 may be located at any convenient place and may be substantially removed from the pool 101 without adversely affecting the operation of the facility 100.

There is shown in FIG. 8 of the drawings a second preferred embodiment of an aquatic exercise facility 300 made in accordance with and embodying the principles of the present invention. The facility 300 is like the facility 100 described above, except that a surge tank 390 is provided on both sides of the pool 301 with the attendant pump chambers 355 and solids pits 395. Both the gutters and flumes are active and functional in the facility 300 so as to insure high capacity treatment of the water in the pool 301.

As illustrated, the facility 300 has a bottom wall 302, and an entry end wall 305 and an exit end wall 306 defining the pool 301. An entry area 301 is provided to the left and an exit area 315 is provided to the right. Two covers 321 are respectively associated with the solids pits 395 on either side of the pool 301, and covers 322 are provided with the associated pump chamber 355 on both sides of the pool 301. Gratings 323 are provided on the tops of the active gutters on both sides of the pool 301 and footwalks 325 are provided on the tops of the flumes on both sides of the pool 301. The operation and use of the facility 300 is like that of the facility 100 described above, and therefore will not be here repeated in the interest of brevity.

Referring to FIGS. 9 to 12 of the drawings, there is illustrated a third embodiment of an aquatic exercise facility 400 made in accordance with and embodying the principles of the present invention. As illustrated, the facility 400 includes a container 401 for a pool of water, the container 401 having a bottom wall 402 (see FIGS. 10 and 12 particularly), two opposed generally parallel side walls 403 extending upwardly from the opposed sides of the bottom wall 402 and extending longitudinally the facility 400, an entry end wall 405 and an exit end wall 406. Disposed to the left in FIGS. 9 and 10 is an entry area generally designated by the numeral 410 and including an entry ramp 411 that inclines downwardly from a deck 420 to the left in FIG. 10 to the entry end wall 405. An exit area 415 is disposed to the right in FIGS. 9 and 10 and includes an exit ramp 416 that extends upwardly from the exit end wall 406 to the level of the deck 420 disposed to the right in FIG. 10. The entry ramp 411 has vertical spaced-apart side walls 412 to direct the animal therealong, while the exit ramp 416 has spaced-apart side walls 417 that direct the animal out of the pool 401.

Referring to FIGS. 9 and 10, it will be seen that the bottom wall 402 slopes downwardly toward a sump 425 formed in the bottom thereof near the entry end wall 405, the sump 425 having a pipe 513 extending downwardly therefrom for a purpose to be described more fully hereinafter. Disposed to the left of the entry end wall 405 is a surge tank 490 that extends the entire width of the pool 401 and is formed by a bottom wall 491, two spaced-apart side walls 492 and a closing end wall 493. Disposed within the surge tank 490 is a solids pit 495 formed by a bottom wall 496 and transversely extending and upstanding side walls 497.

The current through the pool 401 is generated by two propellers 430 each driven by its motor 431 and contained in a compartment formed partially by an inner wall 432. Each propeller 430 has a grille 450 disposed in front thereof, each grille 450 including a plurality of vertical vanes 451 adjustable as to position about the vertical axis thereof so as to direct the flow of water generated by the propellers 430. The speed of each motor 431 is adjustable thus to control the strength of the current generated thereby in the pool 401.

The current of water generated by the propellers 430 is directed generally in the direction of the arrows and from the exit ramp 416 toward the entry ramp 411. A return path for the recirculating water is provided by flumes 470 disposed respectively on the opposed side walls 403 of the pool 401. Each flume 470 has an inclined side wall 471 and a bottom wall 472. Each of the flumes 470 cooperates with an associated gutter 460 and is formed by an inner wall 461 having an upper edge 462, a first bottom wall 463 disposed inwardly of the inner wall 461, a sloping bottom wall 464 outwardly with respect to the inner wall 461 and an outer bottom wall 466 which also serves as a top wall for the associated flume 470. Each of the inclined side walls 471 for each flume 470 has a plurality of openings 473 therein, each of the openings 473 having an associated flow control vane 475 that can be adjusted either fully to close the associated opening 473 or to give a maximum open condition for the opening 473. The vanes 475 aid in controlling the current generated by the propellers 430.

The flumes 470 serve to return water received through the inlet openings 473 thereof from adjacent to the entry end wall 405 back along the flumes 470 and to the inlets for the propellers 430, thus completing the path for circulation of water within the pool 401.

The gutters 460 serve to convey by gravity water and other material that washes over the upper edges 462 toward the entry wall 405 (to the left in FIGS. 9 and 10) and back into the surge tank 490. The gutters 460 empty into headboxes 485 in the surge tank 490 and direct the contents onto sieves 500. Material having a size greater than about twenty thousandths inch falls into the solids pit 495 and an ejector pump 505 therein periodically pumps the contents thereof out through an outlet pipe 506 to a disposal pit, such as the pit 207 described above.

Figure 11:
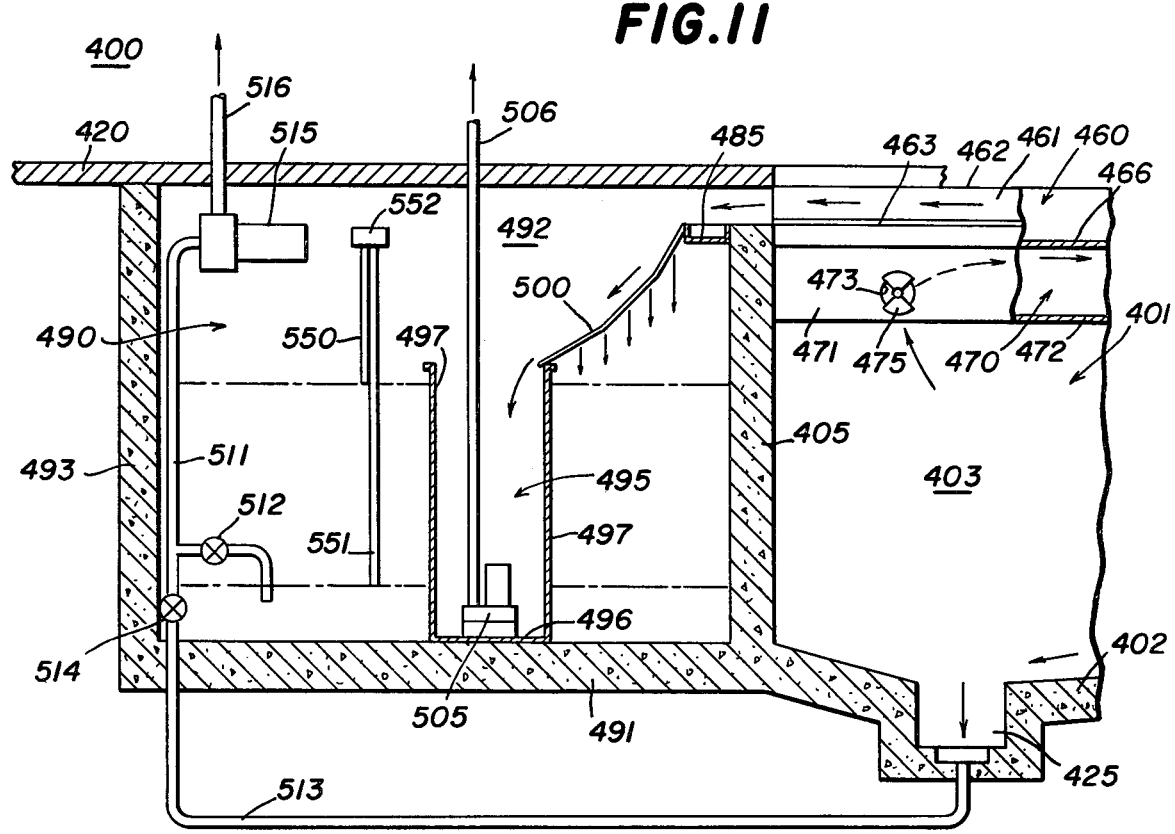
FIG. 11 is a view in longitudinal vertical section through a portion of the facility of FIG. 9 as viewed in the direction of the arrows along the line 11—11 thereof.
Figure 12:
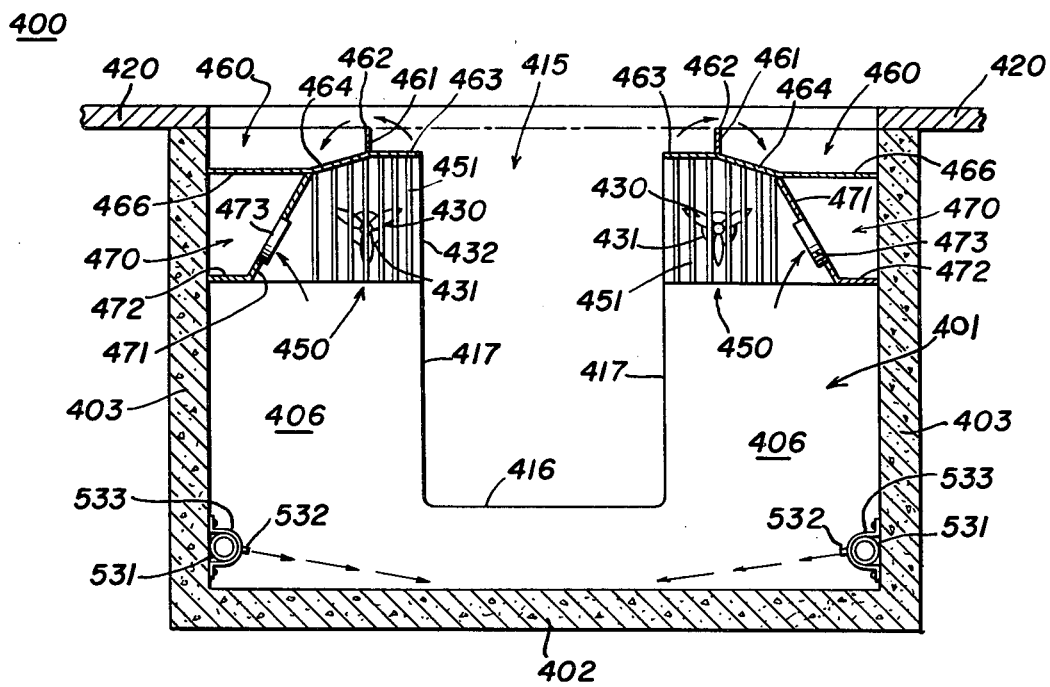
FIG. 12 is an enlarged view in vertical transverse section along the line 12—12 of FIG. 10.

Disposed in the surge tank 490 is a recirculation pump 515 which has the inlet thereto connected to a pipe 511 that connects via a valve 512 to the water within the surge tank 590 and also connects via valve 514 with a pipe 513 that connects to the bottom of the sump 425 in the pool 401 (see FIG. 11 particularly). The outlet from the pump 515 is by means of an outlet pump 516 which goes to a filtration and treatment system such as the system 210 described above.

The return of the filtered and treated water from the filtration treatment system is by means of a return pipe 531 (see FIGS. 10 and 12), there being two return pipes 531 disposed respectively along the inner surfaces of the walls 403 and adjacent to the bottom wall 402 and sloping downwardly in the same fashion as the bottom wall 402. Each of the return pipes 531 has a plurality of exit ports 532 thereon directing the return water toward the center of the bottom wall 402 and downwardly toward the sump 425. The return pipes 531 are held in position by brackets 533. In this fashion, the bottom wall 402 is continually cleaned, and periodically the valve 514 is opened and the contents of the sump 425 are pumped by the pump 514 to a waste disposal pit.

There further is provided in the surge tank 490 a high level sensor 550 and a low level sensor 551 with cooperating control equipment 552. The operation of the sensors 550 and 551 and the other parts of the filtration and treatment system are like those described above with respect to the facility 100, and will not here be repeated.

The manner of using the facility 400 to exercise a horse or other animal is like that described above with respect to facility 100. The facility 400 has all the advantages of the facility 100, and furthermore, provides for return of water from the surface of the pool along both of the gutters 460, whereby to have the advantages of the embodiment of the invention illustrated in FIG. 8 without having the necessity for providing duplicate surge tanks, solids pits and pump chambers.

While there have been described what are at present considered to be the preferred embodiments of the invention, it will be understood that various changes and modifications may be made therein without departing from the spirit and scope thereof, and it is intended to cover in the appended claims all such modifications as fall within the spirit and scope of the invention.

What is claimed is:

1. An aquatic exercise facility comprising a container for a pool of water having an entry area and an exit area, at least a portion of said pool between said entry area and said exit area having a depth sufficient to require the user to swim thereacross, and means for establishing a current of water flowing from adjacent to both sides of said exit area toward said entry area through said deep portion and out past both sides of said entry area, whereby the user entering said pool at said entry area must swim across said deep portion and against the current to reach said exit area, thereby to exercise the user by causing the user to swim against the current flowing through said deep portion.

2. The aquatic exercise facility set forth in claim 1, wherein said container is essentially formed of concrete.

3. The aquatic exercise facility set forth in claim 1, wherein said container is formed of stainless steel.

4. The aquatic exercise facility set forth in claim 1, wherein said entry area and said exit area are spaced apart and in alignment, whereby the user can swim along an essentially rectilinear course from said entry area to said exit area.

5. The aquatic exercise facility set forth in claim 1, wherein said entry area and said exit area include inclined ramps leading respectively into and out of said pool.

6. The aquatic exercise facility set forth in claim 1, wherein said exit area includes steps at least in the portion thereof adjacent to said pool to assist the user in climbing onto said exit area.

7. The aquatic exercise facility set forth in claim 1, and further including means for interrupting the current of water in said pool in the event that the user panics.

8. The aquatic exercise facility set forth in claim 1, wherein said means for establishing a current of water is a motor-driven propeller.

9. The aquatic exercise facility set forth in claim 1, wherein said means for establishing a current of water is two motor-driven propellers in lateral alignment and spaced apart laterally adjacent to said exit area and directing a current of water toward said entry area.

10. The aquatic exercise facility set forth in claim 1, wherein said means for establishing a current of water is a water actuated jet pump.

11. The aquatic exercise facility set forth in claim 1, wherein said means for establishing a current of water is two water actuated jet pumps aligned laterally and spaced apart adjacent to said exit area and directing a current of water toward said entry area.

12. An aquatic exercise facility comprising a container for a pool of water having an entry area and an exit area, at least a portion of said pool between said entry area and said exit area having a depth sufficient to require a user to swim thereacross, means for establishing a current of water flowing from adjacent to said exit area toward said entry area through said deep portion and then laterally from said deep portion and back toward said exit area, and flow control structure adjacent to said deep portion for controlling the lateral flow of the current of water therefrom so that a minimum lateral flow is provided adjacent to said exit area and a maximum lateral flow adjacent to said entry area, said flow control structure providing a minimum current adjacent to said entry area with the current increasing in strength toward said exit area, whereby a user entering said pool at said entry area must swim across said deep portion and against the increasing current as the user approaches the exit area to reach said exit area, thereby to exercise the user by causing it to swim against the increasing current flowing through said deep portion.

13. The aquatic exercise facility set forth in claim 12, wherein said means for establishing a current of water from said deep portion back towards said exit area is an open flume arranged along the longitudinal edges of said pool, and said flow control structure is vanes disposed respectively in openings in the side of said flume disposed toward said deep portion, said vanes being adjustable to control the flow through the associated openings.

14. The aquatic exercise facility set forth in claim 12, wherein said means for establishing a current of water from said deep portion back towards said exit area is a closed flume arranged along the longitudinal edges of said pool, and said flow control structure is vanes disposed respectively in openings in the side of said flume disposed toward said deep portion, said vanes being adjustable to control the flow through the associated openings.

15. An aquatic exercise facility comprising a container for a pool of water having an entry area and an exit area, a portion of said pool between said entry area and said exit area having a depth sufficient to require the user to swim thereacross, means for establishing a current of water flowing from adjacent to said exit area toward said entry area through said deep portion, a return channel for water disposed on at least one side of said deep portion for returning water from adjacent to said entry area to adjacent to said exit area, adjustable flow control structure disposed between said deep portion and said return channel for adjusting the rate of flow of water through said deep portion, whereby a user entering said pool at said entry area must swim across said deep portion and against the current to reach said exit area, thereby to exercise the user by causing it to swim against the current flowing through said deep portion.

16. The aquatic exercise facility set forth in claim 15, wherein said return channel is an open flume.

17. The aquatic exercise facility set forth in claim 16, wherein a return channel is provided on both sides of said deep portion.

18. The aquatic exercise facility set forth in claim 15, wherein said adjustable flow control structure includes adjustable vanes disposed in openings in said return channel.

19. An aquatic exercise facility comprising a container for a pool of water having an entry area and an exit area, at least a portion of said pool between said entry area and said exit area having a depth sufficient to require the user to swim thereacross, mechanism for pumping water having an inlet and an outlet adjacent to said exit area for establishing a current of water through said deep portion flowing from adjacent to said exit area toward said entry area, a control for said pumping mechanism controlling the amount of water pumped by said mechanism and for thus controlling the velocity of the current through said deep portion, whereby a user entering said pool at said entry area must swim across said deep portion and against the current to reach said exit area, the velocity of the current in said deep portion being adjusted to provide the optimum current for each user thereby to give each user the optimum exercise by causing it to swim against the adjusted current flowing through said deep portion.

20. The aquatic exercise facility set forth in claim 19, wherein said mechanism for pumping water is a water actuated jet pump, and said control is a valve controlling the actuating water stream to said jet pump.

21. The aquatic exercise facility set forth in claim 19, wherein said mechanism for pumping water is two laterally spaced apart and laterally aligned water actuated jet pumps adjacent to said exit area, and said control is a single valve controlling the amount of water fed through the actuating streams for said jet pumps whereby the output from said pumps is balanced.

22. The aquatic exercise facility set forth in claim 19, wherein said mechanism for pumping water is a motor-driven propeller, and said control is a control for the speed of operation of the motor driving said propeller.

23. The aquatic exercise facility set forth in claim 19, wherein said mechanism for pumping water is two laterally spaced apart and laterally aligned motor-driven propellers adjacent to said exit area, and said control is controls for the speed of operation of the motors driving said propeller.

24. An aquatic exercise facility comprising a container for a pool of water having an entry area and an exit area, at least a portion of said pool between said entry area and said exit area having a depth sufficient to require the user to swim thereacross, mechanism for pumping water having an inlet and an outlet adjacent to said exit area for establishing a current of water through said deep portion flowing from adjacent to said exit area toward said entry area, a control for said pumping mechanism controlling the amount of water pumped by said mechanism, a return channel for water disposed on at least one side of said deep portion for returning water from adjacent to said entry area to adjacent to said exit area, and adjustable flow control structure disposed between said deep portion and said return channel for adjusting the rate of flow of water therebetween, the velocity of the current in said deep portion being jointly adjusted by said pumping mechanism control and said adjustable flow control structure to provide the optimum current for each user thereby to give each user the optimum exercise by causing it to swim against the adjusted current flowing through said deep portion.

25. The aquatic exercise facility set forth in claim 24, wherein said mechanism for pumping water is a water actuated jet pump, said pumping mechanism control is a valve in the supply to the high velocity actuating water stream, and said adjustable flow control structure is vanes in openings in said return channel.

26. The aquatic exercise facility set forth in claim 24, wherein said mechanism for pumping water is a motor-driven propeller, said pumping mechanism control is a speed control for the motor driving said propeller, and said adjustable flow control structure is vanes in associated openings in said return channel.

27. The aquatic exercise facility set forth in claim 24, wherein said mechanism for pumping water is two laterally aligned and laterally spaced apart water actuated jet pumps disposed adjacent to said animal exit area, said pumping mechanism control is a single valve controlling the high velocity water streams to said jet pumps, and a return channel for water is provided on both sides of said deep portion of said pool, said adjustable flow control structure being vanes respectively disposed in openings in said return channels.

28. The aquatic exercise facility set forth in claim 24, wherein said mechanism for pumping water is two laterally aligned and laterally spaced apart motor-driven propellers disposed adjacent to said animal exit area, said pumping mechanism control are speed controls for the motors driving said propellers, and a return channel is provided on both sides of said deep portion of said pool, said adjustable flow control structures being vanes disposed respectively in openings in said return channels.

29. An aquatic exercise facility comprising a container for a pool of water having an entry area and an exit area, a portion of said pool between said entry area and said exit area having a depth sufficient to require a user to swim thereacross, mechanism for pumping water having an inlet and an outlet adjacent to said exit area for establishing a current of water through said deep portion flowing from adjacent to said exit area toward said entry area, and flow directing mechanism at the outlet from said water pumping mechanism for directing the current of water along the sides of said deep portion to provide a higher velocity of current along the sides of said deep portion than in the middle thereof, whereby a user entering said pool at said entry area must swim across said deep portion in the middle thereof and against the current to reach said exit area, thereby to exercise the user by causing it to swim against the current flowing through said deep portion.

30. The aquatic exercise facility set forth in claim 29, wherein said flow directing mechanism is a set of spaced-apart vanes for directing the current of water passing thereby.

31. The aquatic exercise facility set forth in claim 29, wherein said flow directing mechanism is a set of spaced-apart vanes that are adjustable so as to adjust the direction of the current of water flowing thereby.

32. An aquatic exercise facility comprising a container for a pool of water having an entry area and an exit area, a portion of said pool between said entry area and said exit area having a depth sufficient to require a user to swim thereacross, means for establishing a current of water flowing from adjacent to both sides of said exit area toward said entry area through said deep portion and out past both sides of said entry area, whereby a user entering said pool at said entry area must swim across said deep portion and against the current to reach said exit area, and a water filtration and treatment system associated with said pool for receiving a portion of the flow of water through said pool for filtering and treatment thereof.

33. The aquatic exercise facility set forth in claim 32, and further comprising a surge tank adjacent to said pool and receiving water from the surface of said pool thereinto, said water filtration and treatment system being connected to said surge tank for receiving water therefrom for filtering and treatment.

34. The aquatic exercise facility set forth in claim 33, wherein water is removed from both longitudinal sides of said pool and conveyed to said surge tank.

35. The aquatic exercise facility set forth in claim 33, wherein said water filtration and treatment system includes a sieve for straining out larger waste particles and a sand filter for filtering out small waste particles.

36. The aquatic exercise facility set forth in claim 35, wherein said water filtration treatment system includes a heater for heating the water flowing therethrough.

37. An aquatic exercise facility comprising a container for a pool of water having an entry area and an exit area, a portion of said pool between said entry area and said exit area having a depth sufficient to require a user to swim thereacross, means for establishing a current of water flowing from adjacent to said exit area toward said entry area through said deep portion, a water filtration and treatment system associated with said pool for receiving a portion of the flow of water through said pool for filtering and treatment thereof, and channel structure disposed on at least one side of said deep portion and including a return channel and a treatment channel, said return channel serving to return water from said deep portion to said current establishing means and said treatment channel conveying water from said deep portion to said water filtration and treatment system.

38. The aquatic exercise facility set forth in claim 37, wherein said return channel has a plurality of openings therein along the length thereof, and a vane is disposed in each opening for adjusting the flow of water therethrough.

39. The aquatic exercise facility set forth in claim 37, wherein said return channel is an open flume.

40. The aquatic exercise facility set forth in claim 37, wherein said return channel has openings therein along the length thereof disposed well below the surface of the water in said pool, and said treatment channel receives surface water from said pool.

41. The aquatic exercise facility set forth in claim 37, wherein a channel structure is provided on both sides of said pool.

42. The aquatic exercise facility set forth in claim 37, wherein a channel structure is provided on both sides of said pool, one of said channel structures having only a return channel therein.

43. The aquatic exercise facility set forth in claim 37, wherein two channel structures are provided respectively disposed on opposite sides of said pool, and two water filtration and treatment systems are provided each respectively associated with one of said channel structures.

44. An aquatic exercise facility comprising a pool of water disposed in a container having a bottom wall and opposed side walls and opposed end walls, an entry area in one of said end walls and an exit area in the other of said end walls, a portion of said pool between said entry area and said exit area having a depth sufficient to require a user to swim thereacross, said bottom wall having a waste solids sump therein and sloping downwardly towards said sump, means for establishing a current of water flowing from adjacent to said exit area toward said entry area through said deep portion, whereby a user entering said pool at the entry area must swim across said deep portion and against the current to reach said exit area, a water filtration and treatment system associated with said pool for receiving a portion of the flow of water through said pool for filtering and treatment thereof and having a return conduit, and a return pipe having one end connected to said conduit and having the other end extending along said bottom wall with said pool and having outlets directing streams of water along said bottom wall and toward said sump.

45. The aquatic exercise facility set forth in claim 44, wherein an inlet pipe is disposed along each of said side walls adjacent to said bottom wall and both having the outlets therefrom directed along said bottom wall toward said sump.

46. An aquatic exercise facility comprising a container for a pool of water having an entry area and an exit area, a portion of said pool between said entry area and said exit area having a depth sufficient to require a user to swim thereacross, means for establishing a current of water flowing from adjacent to said exit area toward said entry area through said deep portion, whereby a user entering said pool at said entry area must swim across said deep portion and against the current to reach said exit area, a water filtration system associated with said pool for receiving a portion of the flow of water through said pool for filtering thereof, said filtration system including a bed of particulate matter through which the water is passed downwardly to remove entrained solids therefrom, a fan for generating a high volume and high velocity air stream upwardly through said bed to blow the larger particles therefrom and to a dump therefor, means for passing an oxidizing agent through said bed to assist in breaking up and oxidizing organic material filtered from the water passing therethrough, and a connection to said bed for flushing water therethrough in a direction opposite to the passage of water during the filtering activity of said bed.

47. The aquatic exercise facility set forth in claim 46, wherein said blower and said means for passing an oxidizing agent are constructed and arranged to operate simultaneously to blow air and to feed the oxidizing agent to said bed.

48. The aquatic exercise facility set forth in claim 46, and further comprising a sieve for removing large solid particles from the portion of the water flowing to said particulate bed.

49. An aquatic exercise facility for animals comprising a container for a pool of water having an animal entry area and an animal exit area, at least a portion of said pool between said animal entry area and said animal exit area having a depth sufficient to require an animal to swim thereacross, abutments along either side of said deep portion extending inwardly from the walls of said container adjacent to the water level in said pool for engaging the bodies of the animals and thus to maintain the legs of the animals at a safe distance from the walls of said container, and means for establishing a current of water flowing from adjacent to said animal exit area toward said animal entry area through said deep portion, whereby an animal entering said pool at said animal entry area must swim across said deep portion and against the current to reach said animal exit area, thereby to exercise the animal by causing it to swim against the current flowing through said deep portion.

50. An aquatic exercise facility comprising a container for a pool of water having an entry area and an exit area, a portion of said pool between said entry area and said exit area having a depth sufficient to require a user to swim thereacross, means for establishing a current of water flowing from adjacent to said exit area toward said entry area through said deep portion, whereby a user entering said pool at said entry area must swim across said deep portion and against the current to reach said exit area, a water filtration and treatment system associated with said pool for receiving a portion of the flow of water through said pool for filtering and treatment thereof, said water filtration and treatment system including a pH sensor and chlorine content sensor, and a supply of chlorine and a supply of acid for treating the water flowing through said water filtration and treatment system, and a surge tank adjacent to said pool and receiving water from the surface of said pool thereinto, said water filtration and treatment system being connected to said surge tank for receiving water therefrom for filtering and treatment.

* * * * *